United States Patent
Cueto

[11] Patent Number: 6,074,216
[45] Date of Patent: Jun. 13, 2000

[54] INTELLIGENT INTERACTIVE BROADCAST EDUCATION

[75] Inventor: Jose Augusto Fernandez Cueto, Estado de Mexico, Mexico

[73] Assignee: Hewlett-Packard Company, Palo Alto, Calif.

[21] Appl. No.: 09/112,066

[22] Filed: Jul. 7, 1998

[51] Int. Cl.[7] ............................. G09B 3/00; G09B 7/00; G09B 19/00

[52] U.S. Cl. ..................... 434/322; 434/118; 434/350; 434/362

[58] Field of Search .................... 434/107, 307 R, 434/322, 323, 324, 327, 331, 332, 335, 336, 350, 351, 352, 353, 362, 118; 348/1, 2, 12, 13, 14, 15, 61; 707/3–5

[56] References Cited

U.S. PATENT DOCUMENTS

| | | | |
|---|---|---|---|
| 5,303,042 | 4/1994 | Lewis et al. | 348/14 |
| 5,508,731 | 4/1996 | Kohorn | 348/1 |
| 5,537,141 | 7/1996 | Harper et al. | 348/12 |
| 5,823,788 | 10/1998 | Lemelson et al. | 434/350 |
| 5,833,468 | 11/1998 | Guy et al. | 434/350 |
| 5,934,910 | 8/1999 | Ho et al. | 434/362 |

*Primary Examiner*—Robert A. Hafer
*Assistant Examiner*—John Edmund Roynak

[57] ABSTRACT

An interactive education process permits students at remote locations to provide feedback to an instructor in an ordered manner. Each student is provided with a network connection to an interactivity engine which includes a natural language interface. Responses to the feedback are provided through the interactivity engine to the student. In addition, the responses are ranked in accordance with the number of users logged on, and the number and nature of the questions or other feedback. If there is a significant number of questions or feedback on the same subject, the responses are grouped and are provided to a stage manager or the instructor for broadcast response. The inquiries and responses are published at an internet site and are accessible by all of the students. By using this technique, student feedback during remote instruction is facilitated, without overburdening the instruction process. In addition, the students are given an ability to participate in the instruction in an active manner.

13 Claims, 1 Drawing Sheet

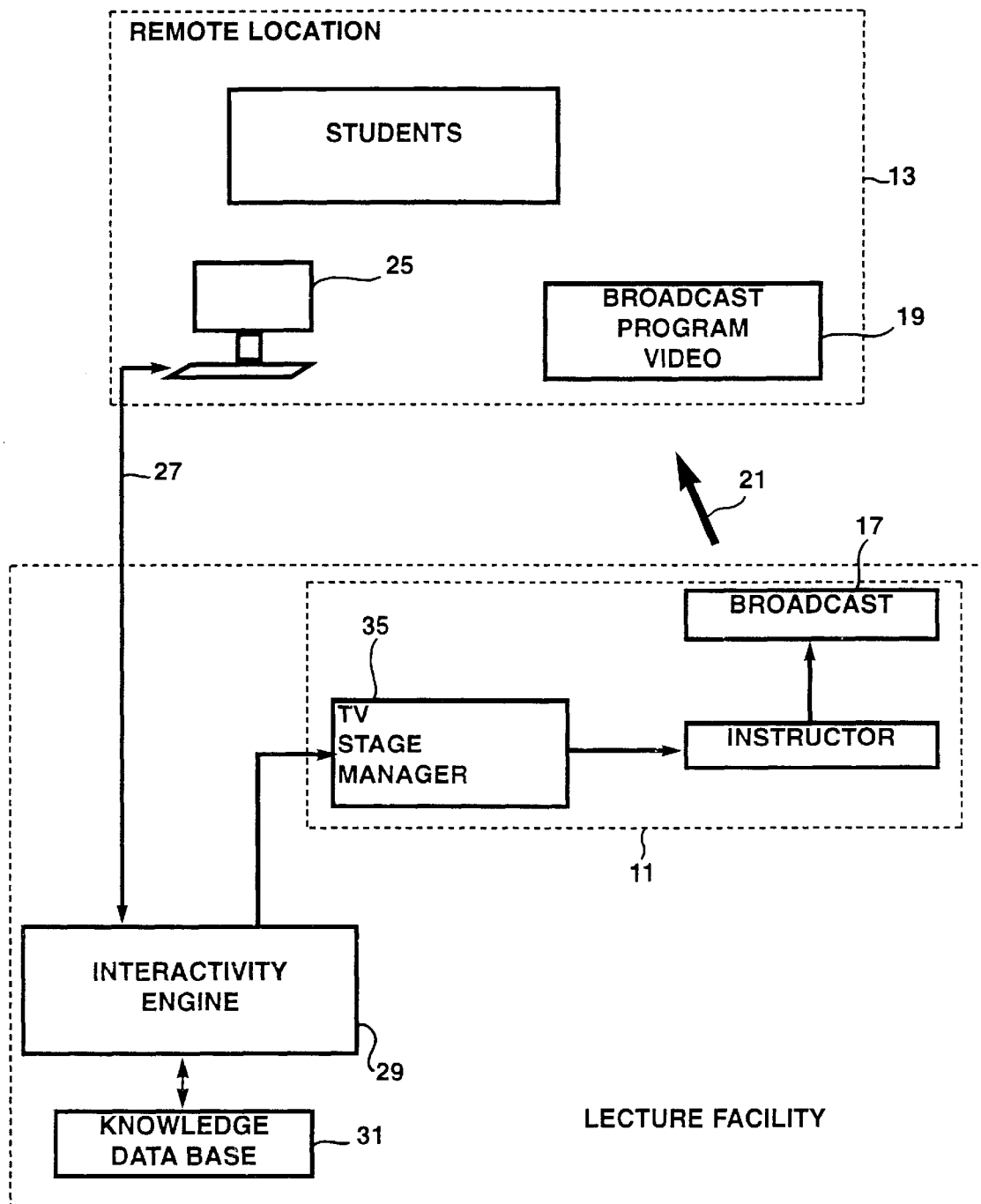

INTELLIGENT INTERACTIVE BROADCAST EDUCATION

FIELD OF THE INVENTION

This invention relates to telecommunications, and more particularly to interactive telecommunications which in the preferred embodiment includes broadcast and computer network communications.

BACKGROUND OF THE INVENTION

In broadcast video instruction, it is common for an instructor in a studio to provide instruction to students at remote locations. The students are able to view the instructor and other lecture materials, often with clarity which is difficult to achieve in lecture hall settings. It is additionally possible to use the facilities of a studio to enhance the instructional experience.

A disadvantage of such an arrangement is that the student at a remote location is less able to communicate with the instructor to provide interactive feedback. This limits the ability of the instructor to engage the entire class in dialogue, limits the ability of the students at the remote location to make direct inquiries and isolates the students at the remote location.

A partial solution to the remote nature of broadcast video instruction is to arrange for some students to be in the studio. These students act as surrogates, and it is hoped that interactive participation of the studio audience will generate a feeling of the classroom experience.

It is also possible to provide interactivity by return connections to the instructor or studio. The student at the remote location remains isolated and it is possible that a large number of questions will either be unanswered or flood the instructor. Even with such an ability to communicate, the student is likely to feel isolated, as the means for feedback is via electronic devices rather than in person. It is the intent of the present invention to augment the electronic feedback in such a way as to provide the student with a more direct feeling of participation in an uninhibited manner.

In a lecture hall environment and in a remote classroom environment, asking questions require that the student weigh the value of the question against the lecture time consumed by the question. In addition, the student has a disincentive to ask a question in front of class for reasons of being reluctant to speak before a group.

It would be desirable to coordinate feedback in such a way that the classroom experience is preserved for the student and education is enhanced by the broadcast video instruction format, rather than made more difficult. If interactive remote instruction is to be accomplished, it is desired that the student be able participate at a location convenient to the student, even to the extent of permitting individual locations for the students where this would be advantage.

It is further desired that the students in an instructional format be afforded an opportunity to enhance their ability to explore the subject matter. It is further desired to provide broadcast video instruction in which the illusion of isolation of the student is eliminated. It is desired, when providing interactive instruction to provide an ability for the student to be provided with information concerning the subject matter regardless of whether an instructor is able to address a particular question during the classroom instruction. In doing so, it is desired to provide the instructor or studio with a tool by which student participatory feedback is available to the instructor in an ordered fashion.

SUMMARY OF THE INVENTION

In accordance with a preferred embodiment of the invention, an interactive instruction session includes a studio broadcast to remote classroom or student locations. Feedback by the student is provided through a computer network connection, such as an internet connection. The internet connection is routed to an interactivity engine. The interactivity engine searches a knowledge database and provides appropriate material in response to the students' questions. In addition, the interactivity engine provides a logical correlation of student inputs in order that the instructor or studio can review the weighted interest of the students in issues concerning the lecture.

The interactive engine reduces the student feedback inputs by use of text analysis software. This permits indexing and retrieval based on single words and by concepts identified by linguistic analysis coupled with specialized statistical routines. After analysis, the ideas in the inquiries can then be sorted with boolean combinations.

Significantly, the interactive search engine groups the questions according to its search strategy and provides an output which can be read at the studio. The output is weighted according to volume, and any other desired criteria, including ambiguity of the resolved search request and subject matters defined by the instructor. In that way the instructor can include responses to questions according to intensity of student interest and according to the need of the instructor to incorporate student feedback into the instruction.

By providing search responses from the knowledge database, each student is provided with a response limited by the ability of the interactivity engine to reduce the feedback to a search query and the extent and relevance of the knowledge database. Since the instructor is able to respond to student inquiries in a meaningful way, the isolation of the remote classroom experience is reduced. In addition, questions from students are significantly less distracting because such questions are handled in a facile manner. The concept that, "there is no such thing as a stupid question," is advanced because the student is able to engage the interactivity engine and knowledge database without interrupting the class.

By providing more functionality to the students' interactive activities, the disadvantage of providing classroom feedback through an electronic interface is offset. Since the instructor is able to respond to the interactive feedback in a more rational fashion than with lecture room instruction, the feeling of isolation experienced by students at remote locations is reduced. The physical separation of the electronic interface in fact may make it easier for many students to participate, as a result of reducing the inhibitions of speaking through the group and as a result of reducing the possibility that the individual questions and comments would be distracting.

The provision of feedback through an interactivity engine further permits the establishment of side discussions if desired. Normally a side discussion can be distracting, but since the side discussion is on a separate electronic medium, the discussion and lecture can co-exist. Such activity on a computer makes it possible for others to review and benefit from the discussions at a later time without diverting attention from the lectures.

The ability of the invention to present the questions in an ordered fashion to the instructor makes is easier for a student to interact with the lecturer and group. As a result, the placement of the electronic communications devices (broadcast transmission and computer terminal) is used to enhance the classroom experience. This decreases the illusion of isolation that the student experiences when in a remote classroom and provides the student with an environment in which there is a feeling of interactivity. This interactivity presents itself as direct interactivity with the interactivity engine's search functions, interactivity between students, and the ability to communicate with the instructor in an ordered fashion.

In addition, the instructor is able to respond to questions presented to the instructor in a ranked order. This allows the instructor to focus the lecture in a manner which focuses on the responses of the student. The instructor has the opportunity to focus answers on those issues which are addressed by the largest number of students, so a corresponding number of students have their issues addressed. The instructor or others also have the opportunity to address "after lecture" issues either subsequent to the lecture. Such questions can also be addressed during the lecture, presumably by assistant instructors. The overall effect is enhanced ability of the student to participate actively in the instruction process.

According to one aspect of the present invention, the input data is provided in a ranked order. The rank is obtained by comparing the input data and determining frequency of recurrent characteristics of the input data. A ranking of an order of frequency of recurrent characteristics of the input data is then performed. In accordance with a further aspect of the invention, the instructor is supplied with access to student reply data. This reply data is provided simultaneously with input data, thereby permitting the instructor to use the reply data in said integration of responses. In accordance with a further aspect of the invention, the interactivity engine provides responses to student inquiries in association with the display of the input data in response to the ranked data. This provides quick access to the responses to the broadcaster. Further, the interactivity engine provides responses to the inquiries in a listed format to members of the audience. This permits each member of the audience to view the results of inquiries by other members of the audience.

In accordance with one aspect of the invention, a broadcast studio provides broadcasts to remote sites. Individual students who are members of an audience at the remote sites are provided with computer terminals such as PCS. The computer terminals have computer network connections to an interactivity engine, which receives inquiries and comments from the students. The interactivity engine provides information to the students via the computer network connections. The interactivity engine categorizes the student inquiries and comments and presents these in an ordered fashion to personnel in the studio. The instructor can then respond to questions and comments in a manner convenient to the instruction.

The interactive feedback and studio configuration permits lectures, non-lecture instruction, and discussions to be arranged under the studio and interactivity structure. This provides a wider flexibility of classroom instruction than would be available with only the traditional lecture, classroom and homework structure.

While the invention is directed to interactive instruction, the invention can be used with other forms of interactive broadcast, such as entertainment, business meetings and conferences.

BRIEF DESCRIPTION OF THE DRAWING

The drawing FIGURE shows is a block diagram showing the communications structure of the preferred embodiment of the invention.

DETAILED DESCRIPTION OF THE INVENTION

Referring to the drawing FIGURE, a lecture or other instruction is provided at a broadcast studio 11, which can be either a conventional classroom with remote connections to a broadcast facility or the broadcast facility itself. The lecture is provided in any convenient manner and is viewed in part by students at remote sites, shown as site 13. The lecture is broadcast to the students, as represented at 17.

The students, in turn, receive a studio broadcast 19 of the instruction at the remote sites 13. This provides a broadcast connection 25 which is at least a one-way link from the instructor to the students. The instruction can thereby be provided in a standard lecture format or in any other manner convenient for instruction.

Individual students at the remote sites 13 are provided with computer terminals 25 such as PCS. The computer terminals 25 have computer network connections 27 to an interactivity engine 29, which receives inquiries and comments from the students through the network connections 27. The interactivity engine 29 provides information to the students via the computer network connections. It is anticipated that the computer network connection 27 will include an internet connection, using a TCP/IP protocol. The type of computer connection should be chosen so as to permit two way communication between the students and the interactivity engine 29 in a manner consistent with internet communications. The computer network connection 27 to the interactivity engine 29 provides a capability of feedback. This allows instruction to be structured around such feedback, regardless of the capabilities of the broadcast connection 25.

The interactivity engine 29 categorizes the student inquiries and comments and presents these in an ordered fashion to personnel in the studio, represented in the FIGURE as a stage manager 35. The instructor can then respond to questions and comments in a manner convenient to the instruction.

Naturally, if the broadcast connection 25 itself permits two way communication, the instructor also has the option to permit feedback through the broadcast connection 25 as well. This does not limit the function of the interactivity engine 29, but instead provides additional functionality to the feedback capabilities of the remote instruction broadcast.

Upon receipt of an inquiry from the student, the interactivity engine 29 performs a database search based on the inquiry, and provides the student making the inquiry with the search results. The student is able to review the search results at a convenient time.

The interactivity engine 29, in its simplest form, is a search engine, which may use Perl routines, Boolean logic or any other convenient search logic. It is anticipated that the more complex logic will be used, such as natural language search software. An example of natural language search software is included in the Clarit text processor sold by Claritech Corporation of Pittsburgh, Pa., U.S.A. Other types of database software, such as sold by Oracle Corporation of Redwood Shores, Calif., U.S.A. are also suitable. The interactivity engine 29 uses a database 31 to retrieve relevant data. The database 31 is shown as local, although it is not necessary that the database be local. Any convenient database or combination of databases may be used, and it is possible to access both a local database with other databases.

The interactivity engine 29 further groups inquiries and comments by students and presents the inquiries in a ranked order. The instructor or studio manager can then view the comments and inquiries and respond accordingly. This makes it possible to respond to the inquiries which represent the greatest interest as represented by the feedback or which has the most relevance to the class, without requiring that every question be reviewed during the lecture. The interactivity engine 29 preferably ranks the inquiries according to a number of students or other users logged on, the number of inquiries, and the nature of the inquiries received.

The ranked order can be obtained by any convenient manner, including raw frequency of occurrence of words, number of keywords appearing in the feedback from the students and frequency of keywords found in the search results. The purpose of the ranked order is to provide the instructor with feedback which is structured in such a way as to allow the instructor to respond to feedback issues raised by multiple students, and to consider the relative number of students who raise the issue. By grouping issues raised by the students, the instructor is also able to address more issues.

In the preferred embodiment, the ranked inquiries are presented to the stage manager 35. The stage manager 35 is then able to provide the inquiries to the instructor who answers the inquiries as a part of the broadcast. The ranked inquiries can also be provided directly to the instructor or to another instructor who is able to provide broadcast response to the inquiries.

From the students' viewpoint, those who raise an issue which is addressed by the instructor receive a response which has a high degree of relevancy to their own feedback. If instructor feedback is not forthcoming, the student is nevertheless provided with the search results which can be reviewed at any convenient time.

One advantage of such a system is that, to the extent that commonality exists between groups of questions and comments, the instructor is able to address the feedback from a large number of students without individually responding to each student. On the student's side, there is a direct participation, often with response from the instructor. If the number of questions is small enough, it is of course possible for the instructor to address them all.

The above description relates specifically to the preferred embodiment of instruction in a broadcast studio format. While a broadcast studio or remote location is described, it is possible to provide the lecture from any convenient forum, including a lecturer's office. Since the broadcast need only provide a link from the instructor to the student, the particular technique for broadcasting may vary, including "live video" internet data transfers and other means for broadcasting. The feedback is, however, primarily through a computer network connection 29 to the interactivity engine 29, so that the link from the instructor to the student can be extended to as many students as desired. It is further possible to provide two way communications through the broadcast connection 21, which would provide the option of using either of the computer network connection 29 and two way communications through the broadcast link, as desired. While the purpose of the invention is to provide interactive communications at remote sites, it is also possible to utilize this invention to provide feedback at a single lecture location or simultaneously at a lecture location and at remote locations. Accordingly, the invention should be read as limited in scope by the claims.

What is claimed is:

1. Method of providing educational instruction and providing a capability of extending the instruction to at least one remote site, the method comprising:

a. broadcasting instructional material, and providing said broadcast to a plurality of students;

b. providing an interactivity engine for receiving input data and generating, as an output, reply data related to the input data, said reply data including student query information;

c. providing a computer network connection between the interactivity engine and said plurality of students;

d. using the interactivity engine to display said input data in a ranked order;

e. providing said display to an instructor in a manner which permits integration of responses to said input data with said broadcast, wherein
   the output of the interactivity engine includes data weighted according to preselected criteria, the preselected criteria including ambiguity of the resolved search requests.

2. The method of claim 1 comprising providing said input data in the ranked order including providing a ranking in order of frequency of recurrency of characteristics of the input data.

3. The method of claim 1 comprising providing access to the reply data to the instructor simultaneously with providing of said input data, thereby permitting the instructor to use the reply data in said integration of responses.

4. The method of claim 1 comprising said interactivity engine including a computer with a searchable database.

5. The method of claim 1 comprising providing, as a part of said computer network connection, an internet connection.

6. The method of claim 1 comprising using a natural language inquiry format for interpreting data received as input data and for generating the reply data.

7. The method of claim 6 comprising ranking the input data according to a detected number of students or other users logged on, a number of inquiries, and a nature of the inquiries received.

8. Method of providing an interactive broadcast to members of an audience at a plurality of remote sites, the method comprising:

a. transmitting a broadcast program and providing the broadcast to the plurality remote sites;

b. providing a computer network connection between said plurality of remote sites to an interactivity engine, the interactivity engine including a computer with a database, and responsive to an input of inquiry data by searching the database for corresponding reply data;

c. providing two way computer network communications between the members of the audience and the interactivity engine through said computer network connection, so that the members of the audience may provide the interactivity engine with feedback as said input of inquiry data, and receive said corresponding reply data;

d. using the interactivity engine to rank said inquiry data and display, to a broadcaster, said input data in a ranked order and provide, as an output, said ranked data;

e. using said display of said input data in the ranked order to provide human response to the input data during the transmission of the broadcast program, wherein
   the output of the interactivity engine includes data weighted according to preselected criteria, the preselected criteria including ambiguity of the resolved search requests.

9. The method of claim 8, comprising using the interactivity engine to provide responses to the inquiries in association with the display of the input data in a ranked order, thereby providing quick access to the responses to the broadcaster.

10. The method of claim 8, comprising using the interactivity engine to provide responses to the inquiries in a listed format to said members of the audience, thereby permitting each member of the audience to view the results of inquiries by other members of the audience.

11. Method of providing an interactive broadcast to members of an audience at a plurality of remote sites, the method comprising:

a. transmitting a single broadcast program in a broadcast format, and providing the broadcast to the plurality remote sites;

b. providing a computer network connection between said plurality of remote sites to an interactivity engine, the interactivity engine including a computer with a database, and responsive to an input of inquiry data by searching the database for corresponding reply data;

c. providing two way computer network communications between the members of the audience and the interactivity engine through said computer network connection, so that the members of the audience may provide the interactivity engine with feedback as said input of inquiry data, and receive said corresponding reply data;

d. using the interactivity engine to rank said inquiry data and display, to a broadcaster, said input data in a ranked order and provide, as an output, said ranked data;

e. using said display of said input data in the ranked order to provide human response to the input data during the transmission of the broadcast program, wherein the output of the interactivity engine includes data weighted according to preselected criteria.

12. The method of claim 11, comprising using the interactivity engine to provide responses to the inquiries in association with the display of the input data in a ranked order, thereby providing quick access to the responses to the broadcaster.

13. The method of claim 11, comprising using the interactivity engine to provide responses to the inquiries in a listed format to said members of the audience, thereby permitting each member of the audience to view the results of inquiries by other members of the audience.

* * * * *